3,325,521
HALOGENATED CRESOL COMPOUNDS AND METHODS FOR THEIR PRODUCTION
Edward F. Elslager and Donald F. Worth, Ann Arbor, Mich., assignors to Parke, Davis & Company, Detroit, Mich., a corporation of Michigan
No Drawing. Filed July 19, 1965, Ser. No. 473,161
6 Claims. (Cl. 260—397.6)

The present invention relates to new halogenated sulfanilyl-o-cresol compounds and to methods for their production. More particularly, the invention relates to new halogenated α-{[p-(sulfanilyl)phenyl]iminio} - o - cresol compounds, having the formula,

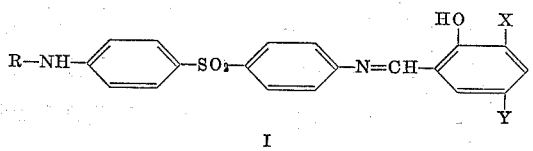

I and to salts thereof; where each of X and Y is bromine or chlorine, and R is formyl, acetyl, allyl, or lower alkyl having less than 5 carbon atoms.

In accordance with the invention, halogenated sulfanilyl-o-cresol compounds having the foregoing formula are produced by the reaction of a 4'-sulfanilylaniline compound, having the formula,

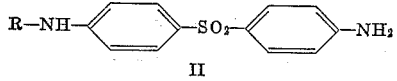

II with a halogenated salicylaldehyde compound, having the formula,

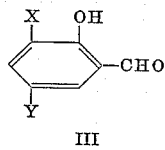

III in an unreactive solvent medium; where X, Y, and R have the aforementioned significance. Suitable unreactive solvents for use in the reaction are lower alkanols, such as methanol, ethanol, isopropanol, and isoamyl alcohol; glycols, such as ethylene glycol and propylene glycol; lower alkanoic acids, such as acetic acid and propionic acid; ethers, such as dioxane, ethylene glycol monomethyl ether, and ethylene glycol dimethyl ether; tertiary amides, such as N,N-dimethylacetamide and N,N-dimethylformamide; and dimethylsulfoxide; as well as mixtures of these. Preferred solvents are lower alkanols and lower alkanoic acids. Although the reaction can be carried out in the presence of a catalytic amount of acid and small amounts of water, best results are obtained when the reaction is carried out under essentially neutral, anhydrous conditions. The reaction is favored by temperatures in excess of 40° C., and is preferably carried out at a temperature between 60° and 150° C. The duration of the reaction is not critical, and may be varied widely, from 30 minutes to 10 hours and longer. Equivalent quantities of reactants are normally employed; a small excess of either is not harmful, however. At the conclusion of the reaction, the reaction product normally precipitates from the solvent medium and is isolated by filtration. In those instances when the product remains in solution, it may be isolated by concentration of the solution or by addition of a suitable precipitant, such as an aliphatic ether or petroleum ether, followed by filtration. Special care should be taken to avoid contacting the reaction product with aqueous acid because it is readily decomposed in an acidic aqueous medium.

The compounds of the invention having Formula I can, under certain conditions, form salts by reaction either with a strong acid, such as a mineral acid, or with a strong base, such as an alkali metal hydroxide or alkoxide. These salts, however, are difficult to isolate and are not very stable under normal conditions. For these reasons, therefore, the free compounds represented by Formula I are highly preferred over the salts. Except in the respect noted above, however, the salts are equivalent to the free compounds of the invention as represented by Formula I.

The compounds of the invention are new chemical compounds that are of value as pharmacological agents. They are antimalarial and antileprosy agents that exhibit long duration of action. It is known that 4,4'-sulfonyldianiline is an effective antimalarial and antileprosy drug. To obtain the desired effects with this drug, however, frequent dosing, as often as once a week, is necessary. For large-scale malaria eradication programs or for mass leprosy treatment, it is impractical to administer a drug on such a frequent schedule. Furthermore, average or large doses of 4,4'-sulfonyldianiline may cause any of a number of toxic side effects. In contrast, the compounds of the present invention, while possessing the high activity of 4,4'-sulfonyldianiline, exhibit long duration of action, thereby making it possible to extend the dosage interval from one week to as long as several months, and are well-tolerated, both locally and systemically. The compounds of the invention can be formulated into suspensions that are pharmaceutically acceptable for intramuscular injection, using suspending vehicles such as 40% benzyl benzoate and 60% caster oil, or water containing emulsifying or dispersing agents.

The invention is illustrated by the following examples.

*Example 1*

A solution of 7.0 g. of 3,5-dibromosalicylaldehyde in 100 ml. of isoamyl alcohol is added to a suspension of 7.3 g. of 4'-sulfanilylacetanilide in 300 ml. of isoamyl alcohol, and the resulting mixture is heated under reflux under a water separator for 3 hours. The mixture is cooled, and the 4,6-dibromo-α-{[p-(N-acetylsulfanilyl)phenyl]imino}-o-cresol that precipitates is isolated, washed with acetone, and dried under reduced pressure at 45° C. for 6 hours; orange, crystalline solid, M.P. 274–276° C.

By utilizing the foregoing procedure, from the reaction of 14.5 g. of 4'-sulfanilylacetanilide and 9.6 g. of 3,5-dichlorosalicylaldehyde there is obtained 4,6-dichloro-α-{[p-(N-acetylsulfanilyl)phenyl]imino}-o-cresol; orange, crystalline solid, M.P. 259–260° C., following crystallization from acetonitrile.

*Example 2*

To a hot solution of 3.0 g. of 4'-sulfanilylformanilide in 100 ml. of ethanol is added 2.08 g. of 3,5-dichlorosalicylaldehyde, and the resulting solution is heated on a steam bath for 4 hours. Upon cooling, the 4,6-dichloro-α-{[p-(N-formylsulfanilyl)phenyl]imino}-o-cresol that precipitates is isolated and dried under reduced pressure at 65° C. for 18 hours; M.P. 214–218° C.

By utilizing the foregoing procedure, with the substitution of 3.05 g. of 3,5-dibromosalicylaldehyde for the 3,5-dichrorosalicylaldehyde there is obtained 4,6-dibromo-α-{[p-(N-formylsulfanilyl)phenyl]imino}-o-cresol; M.P. 235–237° C.

*Example 3*

A warm solution of 5.9 g. of 3,5-dichlorosalicylaldehyde in 50 ml. of ethanol is added to a warm solution of 9.0 g. of N-n-propyl-4,4'-sulfonyldianiline in 600 ml. of ethanol, and the resulting mixture is heated under reflux for 3 hours. The reaction mixture is then concentrated to a volume of 200 ml. and cooled in ice. The 4,6-dichloro- α-{[p-(N-n-propylsulfanilyl)phenyl]imino}-o-cresol that precipitates is isolated and dried under reduced pressure at 40° C. for 18 hours; orange crystals, M.P. 185–187° C., following crystallization from acetonitrile.

By utilizing the foregoing procedure, the following halogenated α-{[p-(sulfanilyl)phenyl]imino}-o-cresol compounds are obtained from the reaction of the designated 4'-sulfanilylaniline compound and halogenated salicylaldehyde compound:

(a) From the reaction of 23.5 g. of 5-bromo-3-chlorosalicylaldehyde and 26.2 g. of N-methyl-4,4'-sulfonyldianiline in 1000 ml. of ethanol, there is obtained 4-bromo-6 - chloro - α - {[p-(N-methylsulfanilyl)phenyl]imino}-o-cresol.

(b) From the reaction of 8.7 g. of 3,5-dibromosalicylaldehyde and 9.0 g. of N-n-propyl-4,4'-sulfonyldianiline in 650 ml. of ethanol, there is obtained 4,6-dibromo-α-{[p-(N-n-propylsulfanilyl)phenyl]imino}-o-cresol.

(c) From the reaction of 23.5 g. of 3-bromo-5-chlorosalicylaldehyde and 30.4 g. of N-isobutyl-4,4'-sulfonyldianiline in 1000 ml. of ethanol, there is obtained 6-bromo-4 - chloro - α - {[p-(N-isobutylsulfanilyl)phenyl]imino}-o-cresol.

Example 4

To a hot solution of 1.70 g. of N-allyl-4,4'-sulfonyldianiline in 100 ml. of ethanol is added 1.03 g. of 3,5-dichlorosalicylaldehyde, and the resulting solution is heated on a steam bath for 4 hours. Upon cooling, the 4,6 - dichloro-α-{[p-(N-allylsulfanilyl)phenyl]imino}-o-cresol that precipitates is isolated and dried under reduced pressure at 65° C. for 18 hours; orange crystals, M.P. 186–188° C.

By utilizing the foregoing procedure, with the substitution of 1.66 g. of 3,5-dibromosalicylaldehyde for the 3,5-dichlorosalicylaldehyde, there is obtained 4,6-dibromo-α-{[p-(N-allylsulfanilyl)phenyl]imino}-o-cresol as brilliant orange crystals.

We claim:
1. A halogenated α-{[p-(sulfanilyl)phenyl]imino}-o-cresol compound, having the formula

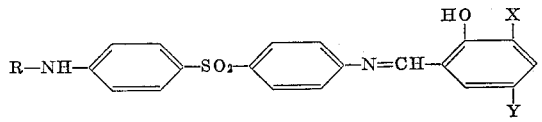

where each of X and Y is a member of the class consisting of bromine and chlorine, and R is a member of the class consisting of formyl, acetyl, allyl, and lower alkyl.

2. 4,6 - dichloro - α - {[p-(N-acetylsulfanilyl)phenyl]imino}-o-cresol.

3. 4,6 - dichloro - α - {[p-(N-acetylsulfanilyl)phenyl]imino}-o-cresol.

4. 4,6 - dibromo - α - {[p-(N-formylsulfanilyl)phenyl]imino}-o-cresol.

5. 4,6 - dichloro - α - {[p-(N-propylsulfanilyl)phenyl]imino}-o-cresol.

6. 4,6 - dichloro - α - {[p-(N-allylsulfanilyl)phenyl]imino}-o-cresol.

References Cited

UNITED STATES PATENTS 2,336,501  12/1943  Raiziss _____ 260—397.6

FOREIGN PATENTS 491,265  8/1938  Great Britain.
579,001  7/1946  Great Britain.

WALTER A. MODANCE, *Primary Examiner.*

HARRY I. MOATZ, *Assistant Examiner.*